(12) United States Patent
Koss et al.

(10) Patent No.: US 8,623,307 B2
(45) Date of Patent: Jan. 7, 2014

(54) PROCESS GAS TREATMENT SYSTEM

(75) Inventors: Peter Ulrich Koss, Zollikon (CH); Michael Koch, Oslo (NO); Joseph P. Naumovitz, Lebanon, NJ (US)

(73) Assignee: ALSTOM Technology Ltd., Baden (CH)

( * ) Notice: Subject to any disclaimer, the term of this patent is extended or adjusted under 35 U.S.C. 154(b) by 454 days.

(21) Appl. No.: 12/881,485

(22) Filed: Sep. 14, 2010

(65) Prior Publication Data

US 2012/0063975 A1 Mar. 15, 2012

(51) Int. Cl.
*B01D 53/62* (2006.01)
*B01D 53/78* (2006.01)
*B01D 53/96* (2006.01)

(52) U.S. Cl.
USPC .......................................... 423/234; 423/220

(58) Field of Classification Search
USPC .................................. 423/220, 234
See application file for complete search history.

(56) References Cited

U.S. PATENT DOCUMENTS

| | | | |
|---|---|---|---|
| 2,106,734 A | 2/1935 | Gollmar | |
| 2,043,109 A | 6/1936 | McKee et al. | |
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 4,515,760 A | 5/1985 | Lang et al. | |
| 4,847,057 A | 7/1989 | Brugerolle et al. | |
| 4,977,745 A | 12/1990 | Heichberger | |
| 4,999,031 A | 3/1991 | Gerhardt et al. | |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A | 6/1994 | Fujii | |
| 5,378,442 A | 1/1995 | Fujii et al. | |
| 5,427,759 A | 6/1995 | Heitmann | |
| 5,453,115 A | 9/1995 | Vuletic | |
| 5,462,583 A | 10/1995 | Wood et al. | |
| 5,599,508 A | 2/1997 | Martinelli et al. | |
| 5,648,053 A | 7/1997 | Mimura et al. | |

(Continued)

FOREIGN PATENT DOCUMENTS

AU 648129 7/1992
AU 678622 6/1995

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Stuart Hendrickson
*Assistant Examiner* — Daniel Berns
(74) *Attorney, Agent, or Firm* — Robert D. Crawford

(57) ABSTRACT

A system is arranged to remove carbon dioxide (CO2) from a gas stream by bringing the gas stream into contact with a circulating ammoniated solution stream such that CO2 is removed from the gas stream by the ammoniated solution stream. A method of removing non-volatile compounds from the circulating ammoniated solution stream includes: introducing a portion of the circulating ammoniated solution stream into a gas-liquid separating device; and separating the introduced ammoniated solution into an ammonia rich gas phase and a liquid phase comprising the non-volatile compounds; and reintroducing the ammonia rich gas phase into the circulating ammoniated solution stream.

17 Claims, 7 Drawing Sheets

(56) References Cited

U.S. PATENT DOCUMENTS

| | | |
|---|---|---|
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 | 8/2007 | Yeh et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |
| 2010/0006803 A1 | 1/2010 | Bravo et al. |
| 2010/0107875 A1 | 5/2010 | Koss et al. |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0588178 | 3/1994 |
| EP | 1759756 | 3/2007 |
| EP | 2230000 | 9/2010 |
| GB | 271852 | 5/1926 |
| GB | 871207 | 6/1961 |
| GB | 899611 | 6/1962 |
| GB | 1348937 | 3/1974 |
| GB | 2331526 | 5/1999 |
| GB | 2454266 | 5/2009 |
| KR | 100703999 B1 | 3/2007 |
| KR | 100 791 091 | 12/2007 |
| SU | 512785 | 5/1976 |
| SU | 1567251 | 5/1990 |
| WO | 98/47604 | 10/1998 |
| WO | 02/089958 | 11/2002 |
| WO | 2003/057348 | 7/2003 |
| WO | 2003/089115 | 10/2003 |
| WO | 2003/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |
| WO | 2008/144918 | 12/2008 |
| WO | 2009/120418 | 10/2009 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and $NO_x$," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

The International Search Report and Written Opinion of the International Searching Authority mailed Feb. 24, 2012 for PCT/US2011/050637.

PROCESS GAS TREATMENT SYSTEM

TECHNICAL FIELD

The present disclosure relates to a method for removal of carbon dioxide from a process gas by contacting the process gas with an ammoniated solution.

BACKGROUND

Most of the energy used in the world today is derived from the combustion of carbon and hydrogen containing fuels such as coal, oil and natural gas, as well as other organic fuels. Such combustion generates flue gases containing high levels of carbon dioxide. Due to the concerns about global warming, there is an increasing demand for the reduction of emissions of carbon dioxide to the atmosphere, why methods have been developed to remove the carbon dioxide from flue gases before the gas is released to the atmosphere.

WO 2006/022885 discloses one such method of removing carbon dioxide from a flue gas, which method includes capturing carbon dioxide from a flue gas cooled to a temperature below ambient temperature (preferably between 0° C. and 20° C., more preferably between 0° C. and 10° C.) in a CO2 absorber by means of an ammoniated solution or slurry. The CO2 is absorbed by the ammoniated solution in the absorber at a temperature between 0° C. and 20° C., more preferably between 0° C. and 10° C., after which the ammoniated solution is regenerated in a regenerator under elevated pressure and temperature to allow the CO2 to escape the ammoniated solution as gaseous carbon dioxide of high purity.

SUMMARY

An objective of the present invention is to improve the carbon dioxide absorption with an ammoniated solution.

This objective, as well as other objectives that will be clear from the following, are according to the present disclosure achieved by the below discussed aspects thereof.

According to one aspect of the present disclosure, there is provided a method of removing non-volatile compounds from a circulating ammoniated solution stream of a CO2 removal system, the system being arranged to remove carbon dioxide (CO2) from a gas stream by bringing the gas stream into contact with the circulating ammoniated solution stream such that CO2 is removed from the gas stream by the ammoniated solution stream, said method comprising: introducing a portion of the circulating ammoniated solution stream into a gas-liquid separating device; separating the introduced ammoniated solution into an ammonia rich gas phase and a liquid phase comprising the non-volatile compounds; and reintroducing the ammonia rich gas phase into the circulating ammoniated solution stream.

Non-volatile compounds may be introduced into, and built up within, the ammoniated solution of the system through e.g. the process gas and/or chemicals such as ammonia which are added to the ammoniated solution. The non-volatile compounds may be detrimental to the system or the CO2 removal process, or generally increase the corrosivity of the ammoniated solution.

According to some embodiments, the carbon dioxide removal system may further comprise a CO2 capture arrangement comprising a CO2 absorber configured to receive the gas stream containing CO2 and contacting the gas stream with the ammoniated solution stream such that CO2 is removed from the gas stream by the ammoniated solution stream to form a CO2 rich ammoniated solution stream.

According to some embodiments, the carbon dioxide removal system may further comprise a regeneration arrangement comprising a regenerator configured to receive the CO2 rich ammoniated solution stream from the CO2 capture arrangement, and to separate CO2 from the ammoniated solution to form a CO2 lean ammoniated solution stream, and to return said CO2 lean ammoniated solution stream to the CO2 capture arrangement.

According to another aspect of the present disclosure, there is provided a carbon dioxide (CO2) removal system for removing CO2 from a gas stream by bringing the gas stream into contact with a circulating ammoniated solution stream such that CO2 is removed from the gas stream by the ammoniated solution stream said system comprising: a gas-liquid separating device configured to receive a portion of the circulating ammoniated solution stream, separate the received ammoniated solution into an ammonia rich gas phase and an ammonia lean liquid phase, and reintroduce the ammonia rich gas phase into the circulating ammoniated solution stream, the gas-liquid separating device further being configured to receive an alkaline additive to be mixed with the received ammoniated solution.

According to another aspect of the present disclosure, there is provided a carbon dioxide (CO2) removal system for removing CO2 from a gas stream by bringing the gas stream into contact with a circulating ammoniated solution stream such that CO2 is removed from the gas stream by the ammoniated solution stream, said system comprising: a CO2 capture arrangement comprising a CO2 absorber configured to receive a gas stream containing CO2 and contacting the gas stream with an ammoniated solution stream such that CO2 is removed from the gas stream by the ammoniated solution stream to form a CO2 rich ammoniated solution stream and a CO2 lean gas stream; an ammonia absorption arrangement comprising: an ammonia absorber configured to receive the CO2 lean gas stream from the CO2 capture arrangement and contacting the gas stream with an aqueous wash solution stream having an ammonia concentration of less than 5% by weight such that ammonia is absorbed in said aqueous wash solution stream to form an ammonia rich wash solution, and a first gas-liquid separating device configured to receive the ammonia rich wash solution from the ammonia absorber and separate the received wash solution into an ammonia rich gas phase and an ammonia lean liquid phase; and a second gas-liquid separating device configured to receive a portion of the circulating ammoniated solution stream, separate the received ammoniated solution into an ammonia rich gas phase and an ammonia lean liquid phase, and reintroduce the ammonia rich gas phase into the circulating ammoniated solution stream, the gas-liquid separating device further being configured to receive the ammonia rich gas phase from the first gas-liquid separating device.

According to another aspect of the present disclosure, there is provided a carbon dioxide (CO2) removal system for removing CO2 from a gas stream by bringing the gas stream into contact with a circulating ammoniated solution stream such that CO2 is removed from the gas stream by the ammoniated solution stream, said system comprising: a gas-liquid separating device configured to receive a portion of the circulating ammoniated solution stream, the gas-liquid separating device comprising: a first stage configured to separate the received ammoniated solution into an ammonia rich gas phase and an ammonia lean liquid phase, the ammonia rich gas phase being reintroduced into the circulating ammoniated solution stream, and a second stage configured to receive the ammonia lean liquid phase from the first stage and separate said liquid phase into a gas phase substantially consisting of water vapor and a liquid phase comprising non-volatile compounds.

The construction and operation of industrial gas purification systems, e.g. for the removal of CO2 from the flue gas produced by the boiler unit of a power plant, are associated with high investment and operational costs. Increasing the number of operational units in a process is generally undesired, since it is associated with additional investment and operational costs. The aspects described herein are based on the surprising realization that in a chilled ammonia process for removal of CO2 from a flue gas, significant process improvements and operational cost reduction can be achieved by the introduction of an additional operational unit at a relatively low investment cost. Process improvements include reduced chemical consumption and reduced waste volume.

BRIEF DESCRIPTION OF THE DRAWINGS

Currently preferred embodiments will now be discussed with reference to the drawings, in which.

DETAILED DESCRIPTION OF EXEMPLARY EMBODIMENTS

Figure 1:
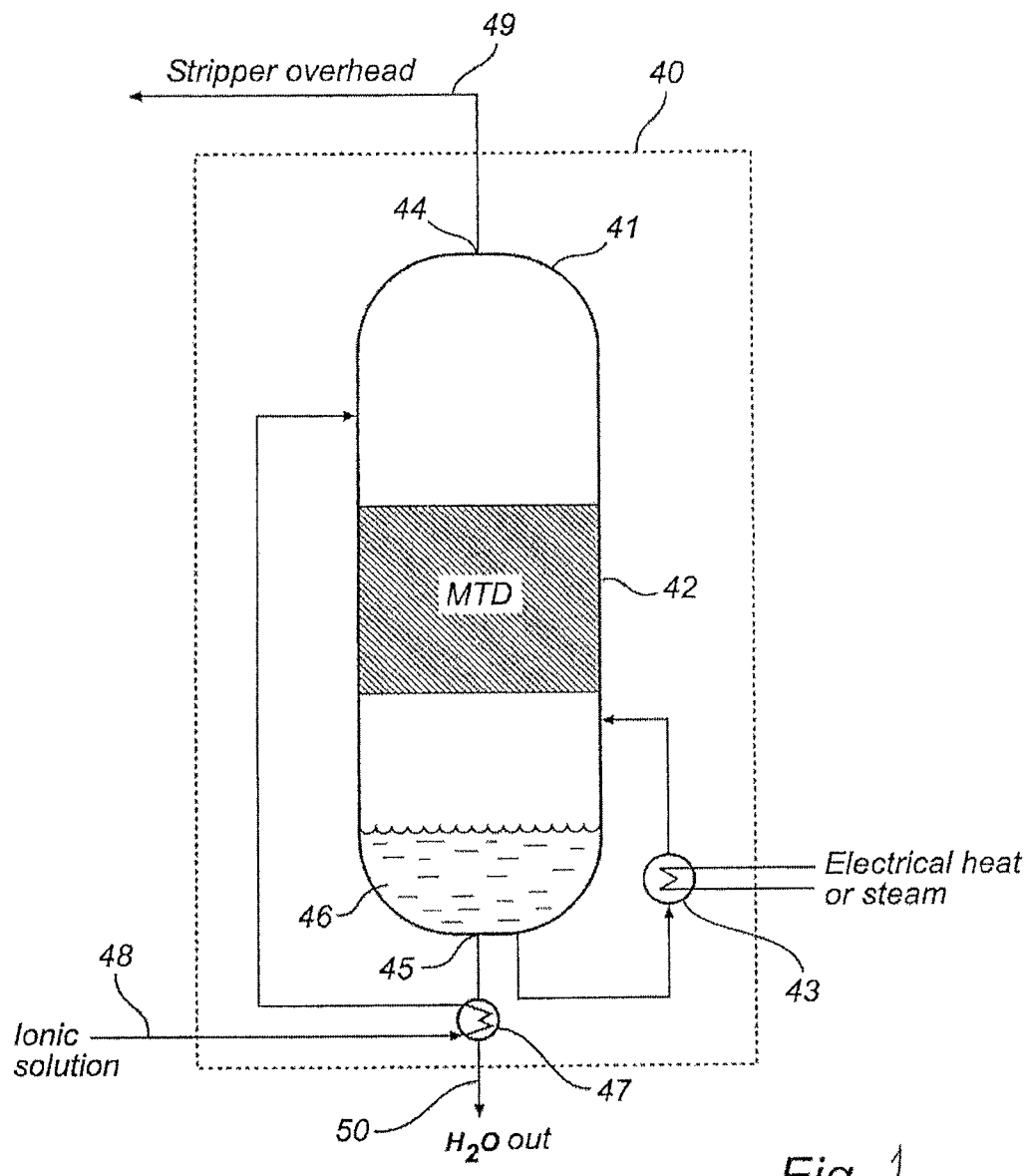
FIG. 1 is a schematic side view depicting a general example of a gas-liquid separating device, in accordance with an embodiment of the present invention.

The process gas may be any type of process gas containing carbon dioxide, such as flue gas from any combustion device such as furnaces, process heaters, incinerators, package boilers, and power plant boilers.

The ammoniated solution may be any type of solution containing ammonia, such as a liquid solution, especially an aqueous solution. The ammonia in the ammoniated solution may e.g. be in the form of ammonium ions and/or dissolved molecular ammonia. The ammoniated solution is typically aqueous and may be composed of, for example, water, ammonia, carbon dioxide and derivatives thereof. The ammoniated solution may also include a promoter to enhance the reaction kinetics involved in the capture of CO2 by the ammoniated solution. For example, the promoter may include an amine (e.g. piperazine) or an enzyme (e.g., carbonic anhydrase or its analogs), which may be in the form of a solution or immobilized on a solid or semi-solid surface.

The capturing of CO2 from the process gas by the ammoniated solution may be achieved by the ammoniated solution absorbing or dissolving the CO2 in any form, such as in the form of dissolved molecular CO2, carbonate or bicarbonate.

Non-volatile compounds which may be present in the ammoniated solution may comprise salts such as ammonium sulphate salts, metals such as selenium, magnesium etc, and solids. Solids formed in the ammoniated solution may be salts, such as ammonium carbonate and ammonium bicarbonate, especially ammonium bicarbonate.

The carbon dioxide removal system comprises piping that connects the different parts of the system and is arranged to allow ammoniated solution and process gas, respectively, to flow through the system as needed. The piping may comprise valves, pumps, nozzles etc. as appropriate to control the flow of ammoniated solution and process gas etc, respectively.

When the ammoniated solution is referred to as "CO2 lean", e.g. when contacting the process gas in the carbon dioxide capture system, or after regeneration, this implies that the ammoniated solution is unsaturated with regard to carbon dioxide and may thus capture more carbon dioxide from the process gas. When the ammoniated solution is referred to as "CO2 rich", e.g. after contacting the process gas in the carbon dioxide capture system, or prior to regeneration, this implies that the absorbent solution is saturated, or at least more saturated than the lean solution, or oversaturated with regard to carbon dioxide and may thus need to be regenerated before being able to capture any more carbon dioxide from the process gas or the carbon dioxide may be precipitated as a solid salt.

The term non-volatile components or compounds is here intended to relate to compounds having a boiling, or sublimation, temperature above the boiling temperature of water, i.e. above 100° C. at atmospheric pressure. Typically, water will be present in both the gaseous and liquid phases of the gas-liquid separating device.

A plant producing a CO2 rich process stream may typically comprise a steam system. The steam system may comprise one or a plurality of steam turbines, linked to one or a plurality of generators for power production. It may be convenient to use at least three serially linked turbines designed to operate at different steam pressures. These turbines may be called high pressure turbine, intermediate pressure turbine and low pressure turbine, respectively. After passing through the low pressure turbine, the steam may be condensed in the condenser of the power plant. Steam from the boiler, prior to passing through the high pressure turbine may typically have a pressure of 150-350 bar. Steam between the high pressure turbine and the intermediate pressure turbine is called high pressure steam and may typically have a pressure of 62-250 bar. Steam between the intermediate pressure turbine and the low pressure turbine is called intermediate pressure steam and may typically have a pressure of 5-62 bar, such as 5-10 bar, and a temperature of between 154° C. and 277° C. (310° F. and 530° F.). Steam after passing the low pressure turbine is called low pressure steam and may typically have a pressure of 0.01-5 bar, such as 3-4 bar, and a temperature of between 135° C. and 143° C. (275° F. and 290° F.). Thus, as referred to in this disclosure, low pressure steam has a pressure of 0.01-5 bar, such as 3-4 bar, and a temperature of between 135° C. and 143° C. (275° F. and 290° F.), intermediate pressure steam has a pressure of 5-62 bar, such as 5-10 bar, and a temperature of between 154° C. and 277° C. (310° F. and 530° F.) and high pressure steam has a pressure of 62-250 bar.

The gas-liquid separating device may allow high temperature boiling components, i.e. non-volatile components, such as salts, metals and possibly water of the ammoniated solution to be removed from the circulating stream of ammoniated solution while minimizing the loss of low temperature boiling components, i.e. volatile components, such as ammonia and derivatives thereof.

The gas-liquid separating device may comprise any type of device for allowing interaction or contact between a gas phase and a liquid phase, such as bed packing or distillation trays, below called a mass transfer device (MTD). The gas-liquid separating device may e.g. comprise a stripper configured to receive a portion of the circulating ammoniated solution stream and heat the solution so as to form a gas phase containing the vapor of low boiling point components of the solution, such as ammonia, and a liquid phase containing the high boiling point components of the solution. The stripper may for example be configured to be heated by low pressure or high pressure steam or by electric heating means, in a reboiler. It may be convenient to allow the stripper to be at least partially heated by the underflow, i.e. liquid phase, of the regenerator. The heating may be via a heat exchanger e.g. in a reboiler of the stripper. Thus, regenerated, i.e. $CO_2$ lean, ammoniated solution may be used as heating medium in the stripper, reducing the need for external heating and thus conserving the overall energy of the system. The underflow may typically have a temperature above 100° C. and a pressure between 10 and 30 bar.

The stripper may preferably be small in size compared to the $CO_2$ absorber and the regenerator. The volume flow capacity of the stripper may be less than 25% of the volume flow capacity of the $CO_2$ absorber or the regenerator, e.g. in a range of 0.01 to 25%, 1-10% or 2-5% of the volume flow capacity of the $CO_2$ absorber or the regenerator. The investment cost of such a small stripper will generally constitute a very low proportion of the total investment cost for the $CO_2$ removal system.

The ammoniated solution for the gas-liquid separating device may be received from, and reintroduced into, any position along circulation of the ammoniated solution. The ammoniated solution for the gas-liquid separating device may for example be $CO_2$ lean ammoniated solution or $CO_2$ rich ammoniated solution.

The gas-liquid separating device may be configured to receive $CO_2$ lean ammoniated solution from the circulating ammoniated solution stream. The gas-liquid separating device may for example be configured to receive $CO_2$ lean ammoniated solution from the regenerator. The regeneration process is generally performed at elevated temperature and elevated pressure, such as a pressure of 2-150 bar, preferably 10-30 bar. This pressure may be created by means of a high pressure pump arranged in connection with the regenerator.

Since the temperature of the lean solution in the regenerator, and when leaving the regenerator, is high, a relatively small amount of heat needs to be added in the stripper in order to separate the volatile components as a gas phase from the non-volatile components as a liquid phase. Since the heating requirement is low, heating may be effected, e.g., by electrical means. In other situations, it may be advantageous to receive the $CO_2$ lean ammoniated solution from other locations of the regenerator arrangement heat exchanger network. Stream temperatures would be in the range of 10-150° C. A advantage may manifest itself in transfer pumps with higher available net positive suction head which may allow for smoother operation. In such situations, a feed/underflow exchanger may be utilized to reduce the heat requirement of the gas-liquid separating device.

Alternatively, the gas-liquid separating device may be configured to receive $CO_2$ rich ammoniated solution from the circulating ammoniated solution stream. The gas-liquid separating device may for example be configured to receive $CO_2$ rich ammoniated solution from the $CO_2$ absorber. Since the pressure of the ammoniated solution in the $CO_2$ absorber, and leaving the $CO_2$ absorber, is low, generally in a range of 1-2 bar, the heat requirement of the stripper can be provided at relatively low temperature, e.g. around or just above the boiling temperature of water at a pressure of 1-2 bar. Thus, the heating requirement of the stripper may be provided by e.g. low pressure steam or other low grade heat.

When the ammoniated solution has been separated in the gas-liquid separating device, the ammonia lean liquid phase, generally comprising water or a low ammonia content aqueous solution, and non-volatile components, is discarded or recycled elsewhere in the $CO_2$ removal system. The ammonia rich gas phase, generally comprising ammonia, $CO_2$ and water vapor is reintroduced into the circulating ammoniated solution stream, resulting in an increase of the ammonia concentration in the circulating ammoniated solution and a decrease in the concentration of non-volatile components.

The gas-liquid separating device may be configured for separation of an ammoniated solution which is aqueous and wherein a major portion, i.e. more than 50% such that more than 60, 70, 80 or 90%, of the water of the ammoniated solution is separated into the ammonia rich gas phase and a minor portion of the water of the ammoniated solution is separated into the liquid phase comprising the non-volatile compounds. Thus, less water and solution volume is lost from the ammoniated solution.

Alternatively, the gas-liquid separating device may be configured for separation of an ammoniated solution which is aqueous and wherein a minor portion of the water of the ammoniated solution is separated into the ammonia rich gas phase and a major portion, i.e. more than 50% such that more than 60, 70, 80 or 90%, of the water of the ammoniated solution is separated into the liquid phase comprising the non-volatile compounds. Thus, excess water introduced to the ammoniated solution, e.g. from the process gas, may be removed.

Additionally, or alternatively, to removing non-volatile compounds from the ammoniated solution, the gas-liquid separating device may thus control and adjust the water balance of the ammoniated solution.

The ammonia rich gas phase may preferably be reintroduced into an ammoniated solution stream wherein the heat used in the stripper for producing the ammonia rich gas phase replaces a portion of the heat requirement in another step of the process, such as the regeneration. Thus the gas-liquid separating device may be configured to reintroduce the ammonia rich gas phase into the regenerator or into an ammoniated solution stream directed towards the regenerator or elsewhere in the system where the heat may be reused.

The ammonia lean liquid phase from the gas-liquid separating device may be discarded, e.g. released to a communal sewage system or the like, or reintroduced to the system. Regardless, it may be convenient to adjust the pH or the lean liquid phase leaving the gas-liquid separating device to a relatively neutral pH such as a pH between 6 and 12, e.g. between 7 and 11 or between 7 and 9 such as about 8. The lean liquid phase may then also be less corrosive.

Also, a neutral or alkaline pH in the range of 7-11 or 7-9 of the ammoniated solution in the gas-liquid separating device may improve the transition of volatile compounds such as ammonia from the liquid to the gas phase, whereby the heating requirement for the gas-liquid separating device may be reduced. When stripping off the ammonia part of ammonia salts of the ammoniated solution, the pH may be lowered through the formation of e.g. sulfuric acid. It may thus be convenient to adjust the pH of the ammoniated solution already before it leaves the gas-liquid separating device, e.g. by adding alkaline material, i.e. an alkaline additive, to the ammoniated solution before or as it enters the gas-liquid separating device, or within the gas-liquid separating device such as to a liquid sump of the gas-liquid separating device.

The addition of alkaline material may conveniently be regulated based on pH measurements of the ammoniated solution e.g. before entering the gas-liquid separating device, before or after adding the alkaline material; at any stage within the gas-liquid separating device, before or after adding the alkaline material, such as in the sump; or after leaving the gas-liquid separating device, as gas or liquid. It may e.g. be convenient to measure the pH of the ammonia lean liquid phase leaving the gas-liquid separating device. The gas-liquid separating device may thus comprise a pH sensor arranged to measure the pH of the ammonia lean liquid phase.

It may be convenient to add the alkaline additive in liquid form to the ammoniated solution in order to facilitate mixing with the solution.

The alkaline additive may e.g. comprise sodium hydroxide (NaOH) and/or potassium hydroxide (KOH).

The gas-liquid separating device may be implemented in a $CO_2$ removal system further comprising a water wash step for removal of residual ammonia from the process gas which has been treated in the $CO_2$ absorber.

Thus, the system may further comprise an ammonia absorption arrangement comprising: an ammonia absorber configured to receive the $CO_2$ lean gas stream from the $CO_2$ capture arrangement and contacting the gas stream with an aqueous wash solution stream having an ammonia concentration of less than 5% by weight such that ammonia is absorbed in said aqueous wash solution stream to form an ammonia rich wash solution; and a wash gas-liquid separating device configured to receive the ammonia rich wash solution from the ammonia absorber and separate the received wash solution into an ammonia rich gas phase and an ammonia lean liquid phase. The wash gas-liquid separating device (below also called: the first gas-liquid separating device) may e.g. be a stripper and/or may be similar to the gas-liquid separating device discussed above for removal of non-volatile compounds (below also called: the second gas-liquid separating device). However, the streaming volume capacity of the wash gas-liquid separating device may be substantially higher, such as twice as high or four times as high as required.

The ammonia rich gas phase from the first gas-liquid separating device may typically comprise 1-5 mol ammonia per kg water. The higher range, about 3-5 mol/kg may be achieved by means of a condenser which condenses some of the water vapor and recycles it to the first gas-liquid separating device.

It may be convenient to integrate the first gas-liquid separating device with the second gas-liquid separating device, especially if they operate at similar pressures e.g. at 1-10, such as 1-5 or 1-2 bar.

The ammonia rich gas phase from the first gas-liquid separating device may be transferred to the second gas-liquid separating device and there used to aid in removing ammonia and other volatiles from the liquid. The ammoniated solution entering the second gas-liquid separating device may typically have an ammonia content of 6-14 mole ammonia per kg solution, whereby the gas phase leaving the second gas-liquid separating device may have an even higher ammonia concentration, which is a much higher content than in the gas phase from the first gas-liquid separating device, thereby allowing the gas phase from the first gas-liquid separating device to aid in the removal of ammonia and other volatiles from the liquid in the second gas-liquid separating device. Also, the gas phase from the first gas-liquid separating device may add heat to the second gas-liquid separating device, significantly reducing the heating requirement of the second gas-liquid separating device. Prophetic experiments have shown that the energy input to the second gas-liquid separating device may be reduced by more than 50% in this way.

Additional potential advantages of this integration include:
Relatively smaller reboiler for the second gas-liquid separating device.
Comparably minor exergy penalty for the second gas-liquid separating device.
The first gas-liquid separating device operates without any influence from the second gas-liquid separating device.
The first and second gas-liquid separating devices have lowest solubility index for ammonium bicarbonate in overhead sections in the condensed phase and hence best operational prospective with respect to clogging, scaling et cetera, because the ammonia concentration in the overhead sections is kept low in the first gas-liquid separating device and is diluted in the second gas-liquid separating device by the first gas-liquid separating device overhead gases.
Integration alternatives for a low pressure cascade, e.g. the second gas-liquid separating device operating at atmospheric pressure with a first gas-liquid separating device at slightly elevated pressure.
Operational flexibility: by boosting second gas-liquid separating device performance with the first gas-liquid separating device overheads, i.e., running more water vapor in the first gas-liquid separating device overheads as "stripping steam". This presupposes sufficient capacity reserve of the first gas-liquid separating device, but allows for a tight design of the second gas-liquid separating device reboiler.

In order to better utilize the overhead gas, i.e. the ammonia rich gas phase, from the first gas-liquid separating device, especially in the embodiment discussed directly above, the gas may conveniently be allowed to enter the second gas-liquid separating device at or below an MTD of the second gas-liquid separating device, enabling the gas to rise through the MTD, meeting liquid solution in the MTD and stripping said solution of at least a part of any ammonia therein.

As discussed above, the ammonia absorber, as well as the first gas-liquid separating device, may have a higher flow capacity than the second gas-liquid separating device. Thus, the aqueous wash solution from the ammonia absorber may have a flow rate which is at least two times, four times, ten times, fifteen times, or 20 times the flow rate of the ammoniated solution entering the second gas-liquid separating device. Typically, the aqueous wash solution from the ammonia absorber may have a flow rate which is between 10 and 100 times, such as between 15 and 50 times or 15 and 30 times, the flow rate of the ammoniated solution entering the second gas-liquid separating device.

Additionally or alternatively, the two gas-liquid separating devices may be integrated by the second gas-liquid separating device being configured to receive at least a portion of the ammonia rich wash solution from the ammonia absorber. The second gas-liquid separating device may thus assist, as needed, the first gas-liquid separating device in removing the ammonia and other volatile compounds from the washing solution.

Additionally or alternatively, the two gas-liquid separating devices may be integrated by combining the two ammonia rich gas phases from the respective devices, e.g. in order to reduce the complexity of the system and reduce the amount of piping, before reentering the circulating ammoniated solution.

The second gas-liquid separating device may alternatively or additionally be provided with two different stages, such as two parts each of which comprising an MTD, wherein a first stage may be configured to receive a portion of the circulating ammoniated solution stream and separate it into an ammonia rich gas phase and an ammonia lean liquid phase, the ammonia rich gas phase being reintroduced into the circulating ammoniated solution stream; and a second stage may be configured to receive the ammonia lean liquid phase from the first stage and separate said liquid phase into a gas phase substantially consisting of water vapor and a liquid phase comprising non-volatile compounds.

Typically, the first stage may be positioned above, and in liquid contact with, the second stage, such that the liquid phase of the first stage may descend, by means of gravity or aided by a pump, into the second stage. The ammoniated solution stream may e.g. enter the second gas-liquid separating device, e.g. a stripper, in or above an MTD of the first stage where it may interact with fumes from a sump of the first stage heated by e.g. low pressure steam to a first stage temperature. Volatile compounds, e.g. ammonia and $CO_2$, of the ammoniated solution may leave the first stage as a gas phase, whereas a first stage liquid phase may be led to an MTD of the second stage where it interacts with meeting fumes from a sump of the second stage heated by e.g. low pressure steam to a second stage temperature which is conveniently higher than the first stage temperature, thus allowing further compounds to leave the gas-liquid separating device as a second stage gas phase consisting mainly of water vapor. A second stage liquid phase comprising non-volatile compounds may leave the gas-liquid separating device.

Thus, the received ammoniated solution may be aqueous, and a major portion of the water of the ammoniated solution may be separated into the gas phase of the second stage, a minor portion of the water of the ammoniated solution may be separated into the liquid phase comprising the non-volatile compounds, and another minor portion of the water of the ammoniated solution may be separated into the ammonia rich gas phase.

Of course, also a $CO_2$ removal system comprising the two-stage separating device may further comprise an ammonia absorption arrangement, a $CO_2$ capture arrangement and/or a regeneration arrangement as discussed above.

An additional or alternative way of integrating the first and second gas-liquid separating devices, especially when using a two-stage second gas-liquid separating device as discussed above, is to reuse at least a portion of the gas phase from the second stage of the second gas-liquid separating device in the first gas-liquid separating device. The second stage gas phase, mainly consisting of water vapor, may e.g. be led to a sump, or into or below a MTD, of the first gas-liquid separating device where it may replace some of the external heating of the first gas-liquid separating device, reducing the heating requirement of the overall $CO_2$ removal system.

Alternatively or additionally, at least a portion the gas phase from the second stage may be used elsewhere within the system to provide heating.

With reference mainly to FIG. 1, a (second) gas-liquid separating device 40 comprising a stripper 41 will now be described.

The stripper 41 may be configured as, for example, a generally cylindrical shaped steel vessel configured to operate within a pre-determined pressure range. The stripper 41 is preferably equipped with one or more suitable mass transfer devices (MTD) 42. The MTD may be, for example, valve trays, sieve trays, structured packing, random packing or other suitable packing materials, or a combination thereof. A heating system/device 43 may be provided in the stripper 41 for heating the ammoniated solution received by the stripper.

The stripper 41 is preferably configured to provide sufficient heat to the ammoniated solution that low boiling point components, for example $NH_3$ and $CO_2$, are transferred to a gas phase, while high boiling point components, for example salts and metals, are collected in a liquid phase at the bottom of the stripper. Typically, both the gas and liquid phases will comprise water and the proportion of water in the gas phase in relation to the proportion of water in the liquid phase may be dependent on the amount of heating. The ammoniated solution may be heated up appropriately via, for example, a re-boiler. The re-boiler may be heated using, for example, electrically generated heat or steam or other hot fluids fed from another part of the $CO_2$ removal system 4 (see FIG. 7), e.g. hot flue gas or hot $CO_2$ lean solution. Similarly, the re-boiler may be heated via steam fed from a source external to the $CO_2$ removal system 4, such as, for example some source within a power generation system or flue gas cleaning system. The heat may be supplied by any heating means capable of providing heat at a temperature above the boiling temperature of water at the operating pressure of the stripper. Since the stripper is generally relatively small in size, it can be heated by any of a number of different methods, including steam in a re-boiler as described above, but also by life steam injection (i.e. injection of steam directly into the bottom of the stripper), by electricity, or by other hot media, such as hot flue gases or hot condensate, or hot overhead gas phase from a first gas-liquid separating device as discussed above. If the stripper is heated by life steam injection, the condensed water from the injected steam may be collected together with the liquid phase at the bottom of the stripper. Life steam injection is efficient and saves the re-boiler.

The stripper 41 is configured to discharge the gas phase, comprising volatile compounds such as $NH_3$ and $CO_2$, via a gas exit 44, and the liquid phase, containing non-volatile compounds, via a liquid exit 45. The stripper may be arranged to produce a liquid phase 46 at the bottom of the stripper containing less than 5% $NH_3$ by weight, such as less than 4%, 3%, 2% or 1% $NH_3$. Preferably, the stripper 41 may be arranged to produce a liquid phase 46 at the bottom of the stripper essentially free of $NH_3$ and $CO_2$.

The liquid phase 46 collected at the bottom of the stripper generally has a temperature in the range of about or slightly below the boiling temperature of water at the relevant pressure, e.g. about 80-100° C. at atmospheric pressure. A heat exchanger 47 may be provided to transfer heat from the liquid phase 46 removed from the bottom of the stripper to the ammoniated solution received from the circulating ionic ammoniated solution stream (and thereby raise the temperature of the ammoniated solution to a predetermined temperature, for example, between 80-100° C.) before it is introduced into the stripper 41.

The portion of ammoniated solution which is received from the circulating ammoniated solution may vary within a wide range depending on the need for removal of non-volatile compounds in a specific $CO_2$ removal system. A suitable portion may be calculated based on, e.g., the accumulation of non-volatiles in a specific $CO_2$ removal system. The portion may also be variable in a system such that variations in, e.g., the moisture content of the incoming gas stream may be compensated.

The portion may for example comprise in a range of 0.01-25%, such as in a range of 0.01-10% or 0.01-5%, of the total mass flow rate of the circulating ammoniated solution. The smaller the portion of ammoniated solution which is received, the smaller and less costly gas-liquid separating device may be used. In specific embodiments, the portion of ammoniated solution which is received may be in a range of 0.05-1% of the total mass flow rate of the circulating ammoniated solution.

The gas-liquid separating device 40 is arranged in fluid connection with the circulating ammoniated solution stream of the CO2 removal system.

The fluid connection may preferably include at least one fluid connection 48 configured to direct a portion of the circulating ammoniated solution stream to a liquid inlet of the gas-liquid separating device 40. The fluid connection may comprise a pump and a flow regulating device operable for regulating the amount of ammoniated solution which is fed to the gas-liquid separating device 40.

The fluid connection may preferably include at least one fluid connection 49 configured to guide the gas phase produced in the gas-liquid separating device 40 from a gas outlet 44 of the gas-liquid separating device 40 into the circulating ammoniated solution stream of the CO2 removal system 4.

The gas-liquid separating device 40 may preferably include at least one fluid connection 50 configured to remove the liquid phase produced in the gas-liquid separating device 40 via a liquid outlet 45.

Because all of the ammoniated solution which circulates in the CO2 removal system 4 contains water and accumulated non-volatiles, ammoniated solution for the gas-liquid separating device 40 may be received from, and reintroduced into, any position along the ammoniated solution circulation. Examples of positions along the ammoniated solution circulation where ammoniated solution may be received and/or reintroduced, include the CO2 absorber 10, the regenerator 11, the first liquid conduit 12 configured to forward CO2 rich ammoniated solution from the CO2 absorber to the regenerator, and the second liquid conduit 13 configured to forward CO2 lean ammoniated solution from the regenerator to the CO2 absorber.

In one embodiment, the ammoniated solution for the gas-liquid separating device 40 may be received from a CO2 rich portion of the circulating ammoniated solution stream, for example from the ammoniated solution collected at the bottom of the CO2 absorber or from the first liquid conduit configured to forward CO2 rich ammoniated solution from the CO2 absorber to the regenerator.

An advantage of this embodiment is that the CO2 rich solution is generally provided at a pressure close to atmospheric pressure, for example at a pressure of less than 2 bar. This means that the gas-liquid separating device 40 and fluid connections 48, 49 do not need to be configured for operation at high pressure. This also facilitates integration with the first gas-liquid separating device of the ammonia absorption arrangement which is often operated at a pressure close to atmospheric such as at 1-2 bar. Compared to an embodiment wherein the ammoniated solution is received at high pressure, it also means that the heat required in order to separate the ammoniated solution into a liquid phase and a gas phase may be provided at a lower temperature. Therefore, in an embodiment wherein the ammoniated solution is received at a pressure close to atmospheric pressure, the gas-liquid separating device 40 may for example use low pressure steam or electrical heating for heating the ammoniated solution in order to separate the ammoniated solution into a liquid phase and a gas phase.

In one embodiment, the ammoniated solution for the gas-liquid separating device 40 may be received from a CO2 lean portion of the circulating ammoniated solution stream, for example from the ammoniated solution collected at the bottom 29 of the regenerator 25 of the regeneration arrangement 12 or from the liquid conduit 13 configured to forward CO2 lean ammoniated solution from the regenerator to the CO2 absorber 15.

An advantage of this embodiment is that the lean solution is generally provided at a high temperature, such as a temperature in the range of 50-200° C., since it has undergone heating in the regenerator 25. This means that a relatively low amount of additional heat may be required in order to separate the ammoniated solution into a liquid phase and a gas phase. The heat may for example be provided by medium pressure steam or by electrical heating.

In an embodiment, the gas phase produced by the gas-liquid separating device 40 may be reintroduced into the regenerator or into a liquid conduit configured to forward a solution stream to the regenerator. An advantage of this embodiment is that heat transferred to the gas phase in the gas-liquid separating device 40 is used to indirectly reduce the heating requirement of the regenerator 25 of FIG. 7. In other words, the energy requirement of the gas-liquid separating device 40 may replace a portion of the energy requirement of the regenerator 25. Accordingly, in this embodiment the operation of the gas-liquid separating device 40 may be made essentially energy neutral.

Figure 2:
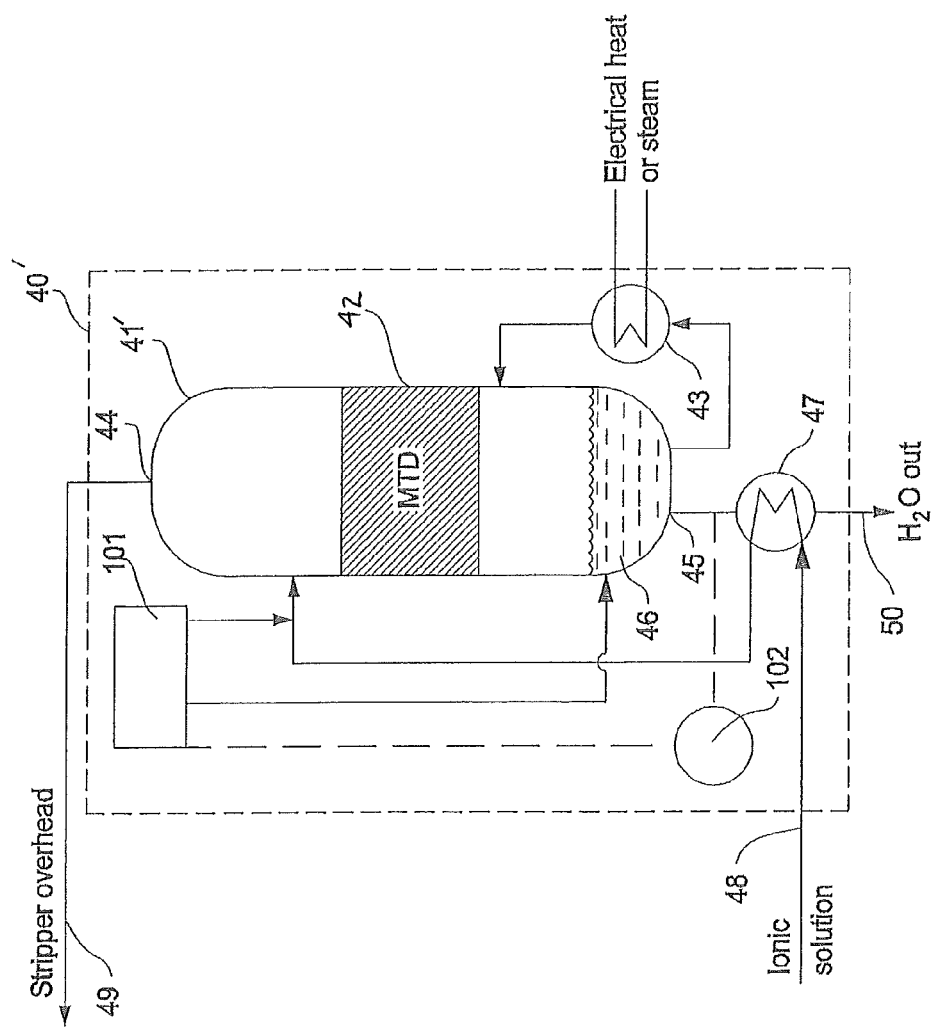
FIG. 2 is a schematic side view depicting an example of a gas-liquid separating device, in accordance with an embodiment of the present invention.

With reference to FIG. 2, a specific embodiment of a (second) gas-liquid separating device 40' comprising a stripper 41' will now be described. The device 40' is essentially the same as the device 40 of FIG. 1 but with a few additional features. Apart from those additional features, reference is made to the discussion above in respect of FIG. 1.

The gas-liquid separating device 40' further comprises a dosing system 101 for adding alkaline material, such as NaOH(aq) or KOH(aq) solution, to the ammoniated solution processed by the gas-liquid separating device 40' in order to ensure a non-corrosive pH and improve the vaporization of volatile compounds such as $NH_3$ and $CO_2$ of the ammoniated solution. The dosing device may be arranged to add alkaline material to the ammoniated solution anywhere in the gas-liquid separating device 40', such as to the conduit guiding the ammoniated solution stream to the stripper 41' and/or to the sump of the stripper 41'. According to the embodiment illustrated in FIG. 2, alkaline solution may be added to both the conduit guiding the ammoniated solution stream to the stripper 41' and the sump of the stripper 41', providing improved flexibility and control of the pH of the ammoniated solution in the stripper 41'. The gas-liquid separating device 40' further comprises a sensor 102 arranged to measure the pH of the ammoniated solution in the gas-liquid separating device 40', which measurement may be used to regulate the dosing of the dosing device 101 such that a desired pH is obtained. The sensor may, depending on the design of the gas-liquid separating device 40', be positioned anywhere in the gas-liquid separating device 40', but it may be convenient to position it to measure the pH of the liquid phase comprising non-volatiles leaving the stripper 41', as is illustrated in FIG. 2. In this way, a desired pH, such as a neutral pH, may be ensured of the liquid that is discarded and eventually released to nature, possibly after additional treatment and cleaning. Also, by measuring on the leaving liquid phase, the pH of the liquid bulk may be measured efficiently, which may be convenient to reduce corrosivity.

Figure 3:
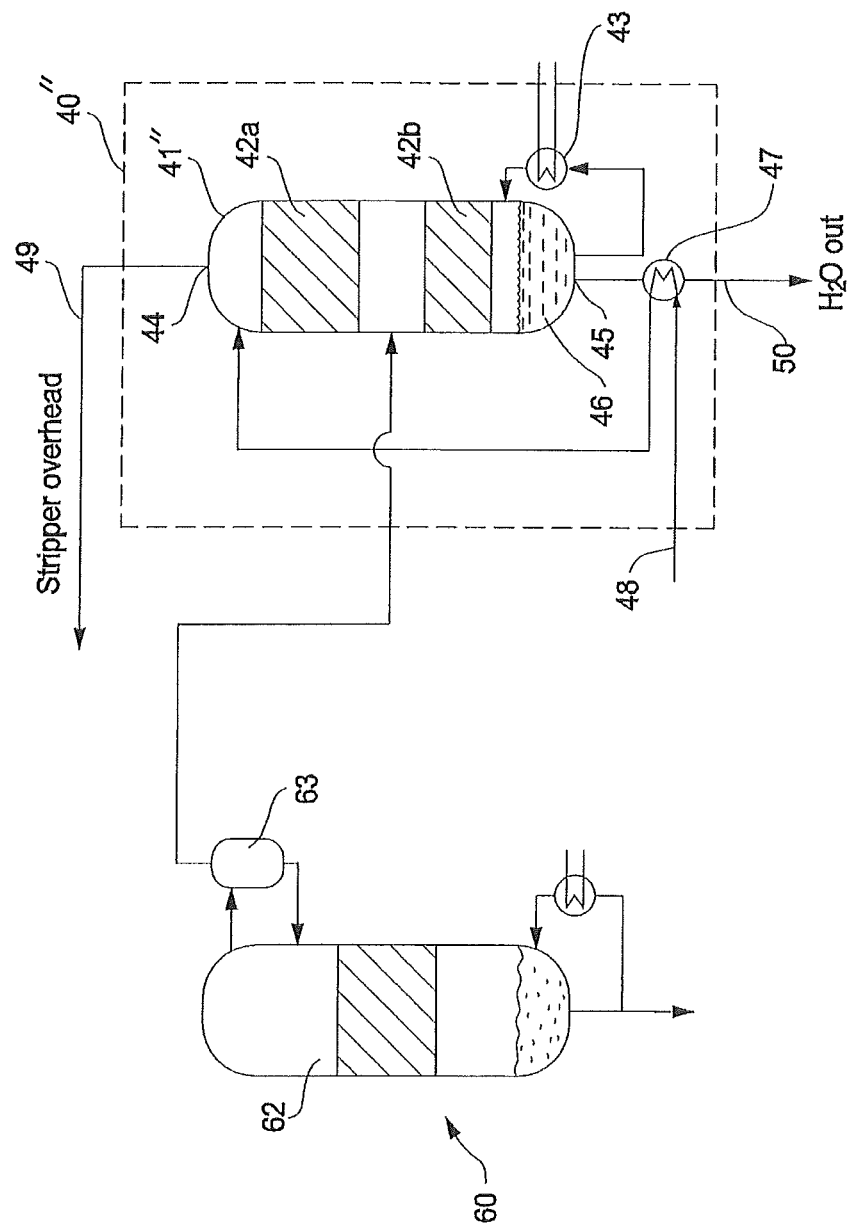
FIG. 3 is a schematic side view depicting an example of a first gas-liquid separating device integrated with a second gas-liquid separating device, in accordance with an embodiment of the present invention.

With reference to FIG. 3, a specific embodiment of a (second) gas-liquid separating device 40" comprising a stripper 41" will now be described. The device 40" is essentially the same as the device 40 of FIG. 1 but with a few additional features. Apart from those additional features, reference is made to the discussion above in respect of FIG. 1.

The stripper 41" is in this embodiment integrated with the (first) gas-liquid separating device 62 of the ammonia absorption arrangement 60, such that the overhead fumes, i.e. the gas phase, from the gas-liquid separating device 62 are guided to and introduced into the stripper 41". The gas phase is introduced into or below the MTD 42 of stripper 41" such that the gas may rise through the MTD 42, meeting liquid falling downward in the MTD 42 and stripping that liquid of volatiles. The gas phase typically has an ammonia content of about 4 molal, which is lower than the ammonia content of the circulating ammoniated solution entered into the stripper 41", allowing it to assist in the stripping of the ammoniated solution. According to the embodiment illustrated in FIG. 3, the MTD 42 consists of two separate MTD parts, 42a and 42b, and the gas phase from the gas-liquid separating device 62 is entered beneath the upper MTD part 42a and above the lower MTD part 42b. Also, according to the embodiment illustrated in FIG. 3 the overhead fumes pass via a condenser 63 in order to raise the concentration of volatiles in the fumes before they are entered into the stripper 41". The fumes prior to the condenser 63 typically have an NH3 concentration of 1-2 molal, whereas the fumes after the condenser 63 typically have an NH3 concentration of 3-5 molal. The liquid condensate, typically essentially pure water, may be returned to the gas-liquid separating device 62 to be reused. The overall energy efficiency of the CO2 removal system 4 of FIG. 7 may thus be reduced, and the heater/reboiler 43 of the stripper 41" may be reduced in size.

Figure 4:
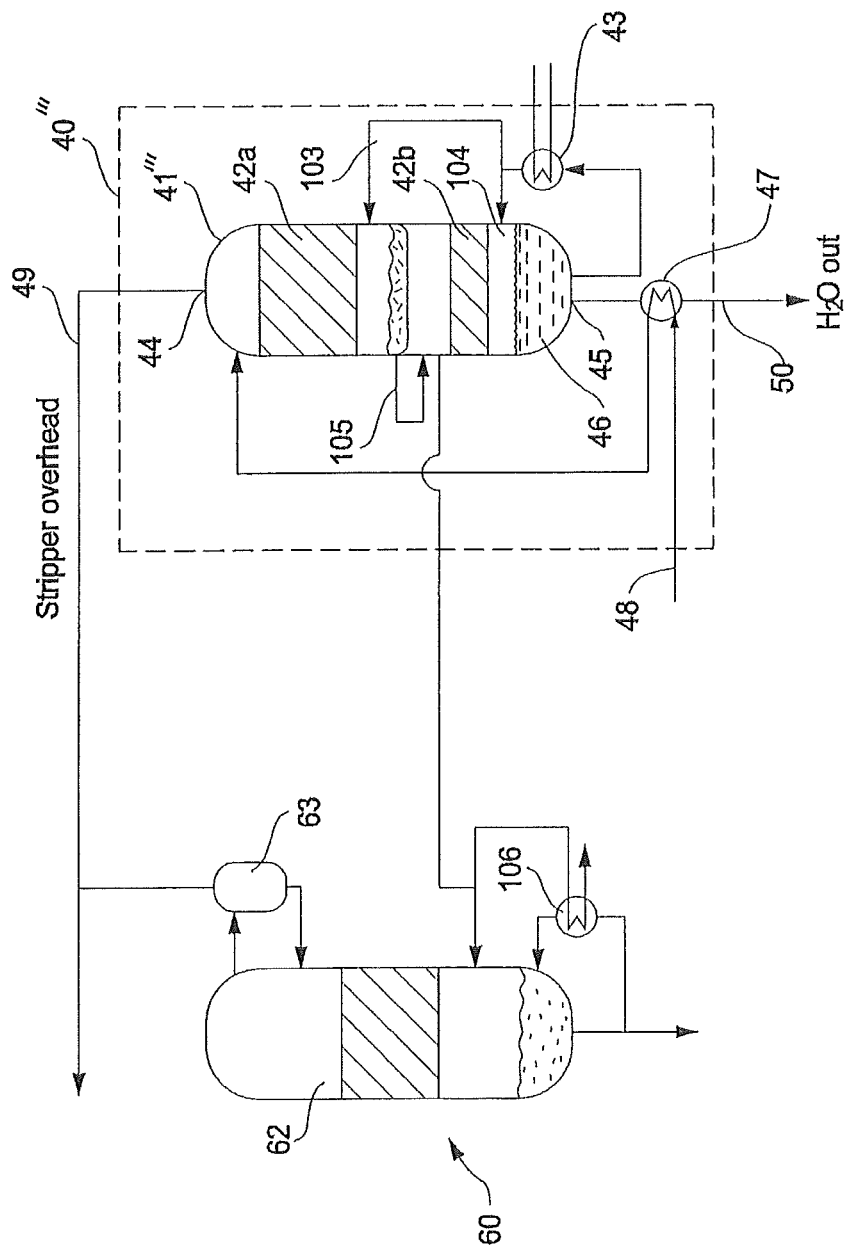
FIG. 4 is a schematic side view depicting an example of a first gas-liquid separating device integrated with a second gas-liquid separating device, in accordance with an embodiment of the present invention.

With reference to FIG. 4, a specific embodiment of a (second) gas-liquid separating device 40''' comprising a stripper 41''' will now be described. The device 40''' is essentially the same as the device 40 of FIG. 1 but with a few additional features. Apart from those additional features, reference is made to the discussion above in respect of FIG. 1.

The gas-liquid separating device 40''' of the embodiment illustrated in FIG. 4 comprises a stripper 41''' which is divided into two stages or compartments 103 and 104, a first stage in the form of an upper compartment 103 comprising an upper MTD 42a and a second stage in the form of a lower compartment 104 comprising a lower MTD 42b. The ammoniated solution from the circulating ammoniated solution stream enters the upper compartment 103, preferably above the upper MTD 42a, and is separated into a gas phase comprising volatile compounds such as NH3 and CO2 and some water vapor. The volatiles gas phase may be returned to the circulating ammoniated solution stream as discussed in respect of other embodiments. The liquid phase of the upper compartment 103, comprising non-volatile compounds and water, may be entered into the lower compartment 104, e.g. guided by a conduit 105 from the sump of the upper compartment 103 to the lower compartment 104, preferably above the lower MTD 42b. In the lower compartment 104, the liquid phase from the upper compartment 103 is separated into a gas phase, mainly consisting of water vapor since the volatile compounds have already been removed in the upper compartment 103, and a liquid phase, comprising non-volatiles and some water which may be discarded or treated as discussed in respect of other embodiments. The ammoniated solution entered into the upper compartment 103 is typically heated to a lower temperature, such as to a temperature at or below the boiling temperature of water, than the liquid entered into the lower compartment 104 which may be heated to the boiling temperature of water in order to produce water steam. Thus, the heating energy requirement of the lower compartment 104 is typically higher, or much higher such as twice as high or more, than the heating energy requirement of the upper compartment 103. The heating may be provided by separate heaters/reboilers of the two stages 103 and 104, or, as illustrated in FIG. 4, by a single heater/reboiler 43.

The water vapor or steam produced by the lower stage 104 may be guided to the (first) gas-liquid separating device 62 of the ammonia absorption arrangement 60, thus integrating the stripper 41''' with the gas-liquid separating device 62. In the gas-liquid separating device 62, the steam may be used to add heating energy to the gas-liquid separating device 62, thus reducing the need for external heating energy for the gas-liquid separating device 62 and lowering the requirements on the heater/reboiler 106 of the gas-liquid separating device 62. As illustrated by FIG. 4, the steam may be used for heating by directly introducing the steam into the gas-liquid separating device 62, preferably below an MTD therein, or it may be used as a heating medium in the heater/reboiler 106 of the gas-liquid separating device 62. The overall energy efficiency of the CO2 removal system 4 may thus be reduced, and the heater/reboiler 106 of the gas-liquid separating device 62 may be reduced in size.

Figure 5:
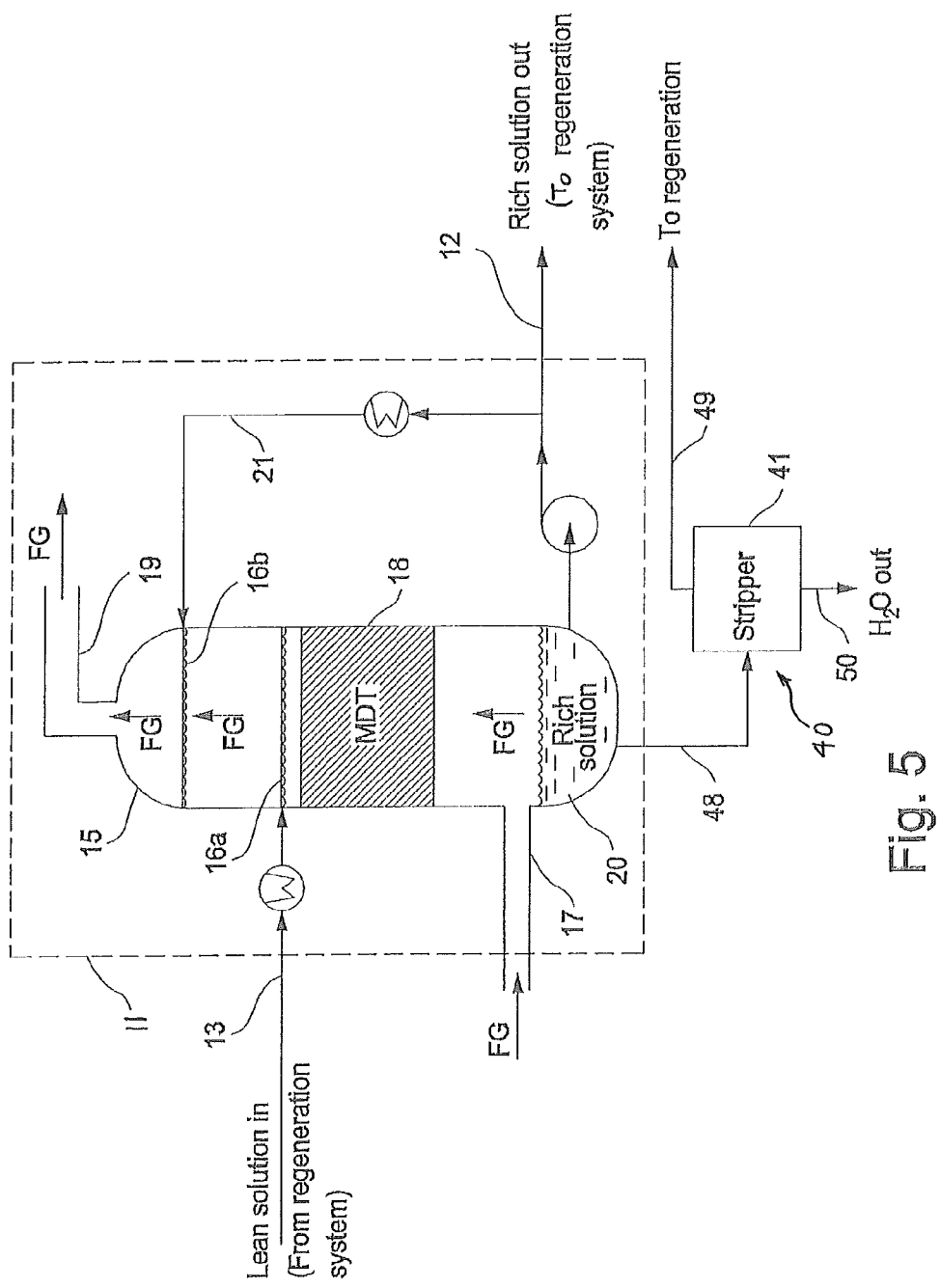
FIG. 5 is a schematic side view depicting an example of a CO2 capture arrangement connected to a gas-liquid separating device, in accordance with an embodiment of the present invention.
Figure 6:
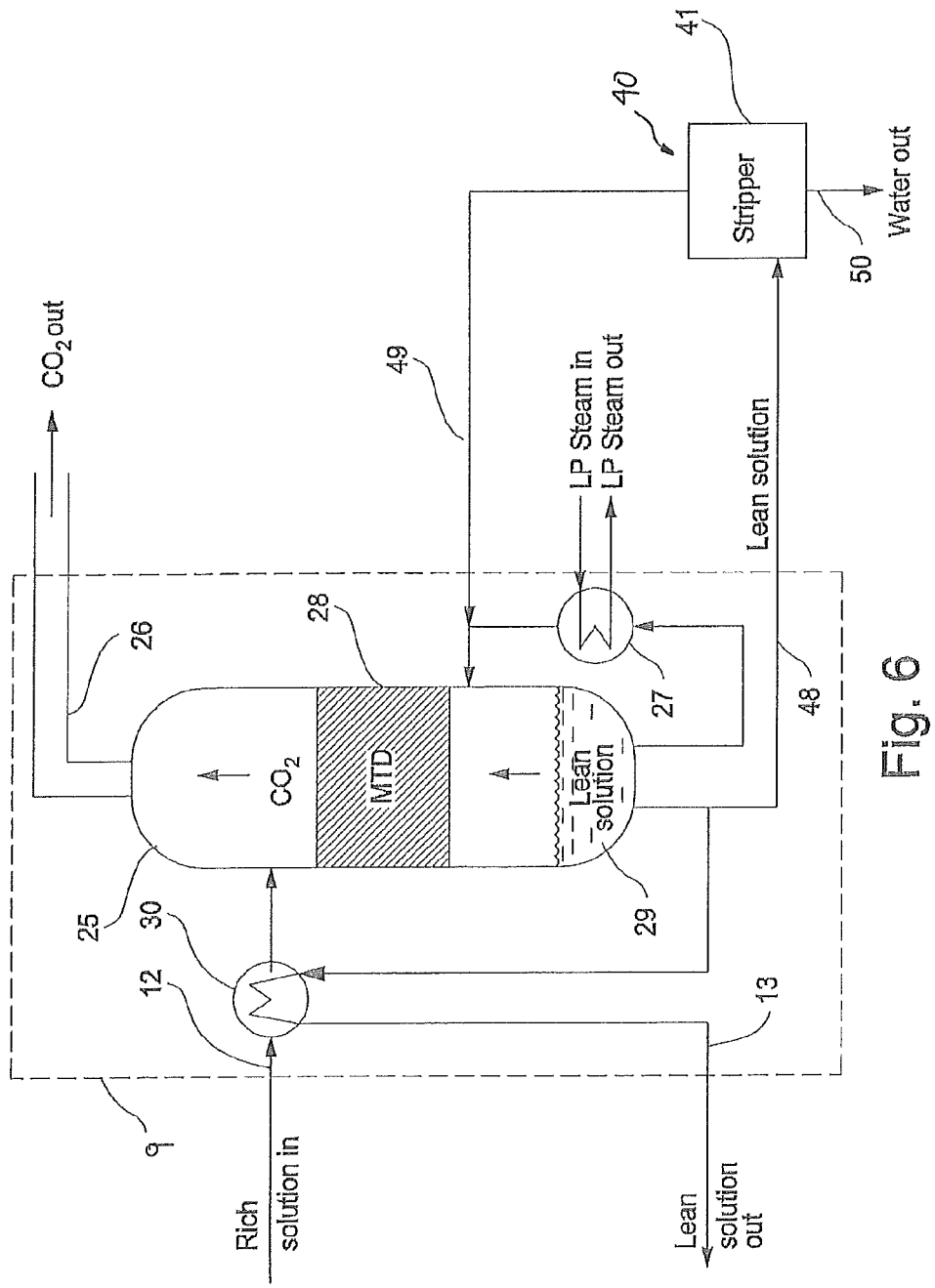
FIG. 6 is a schematic side view depicting an example of a regeneration arrangement connected to a gas-liquid separating device, in accordance with an embodiment of the present invention.
Figure 7:
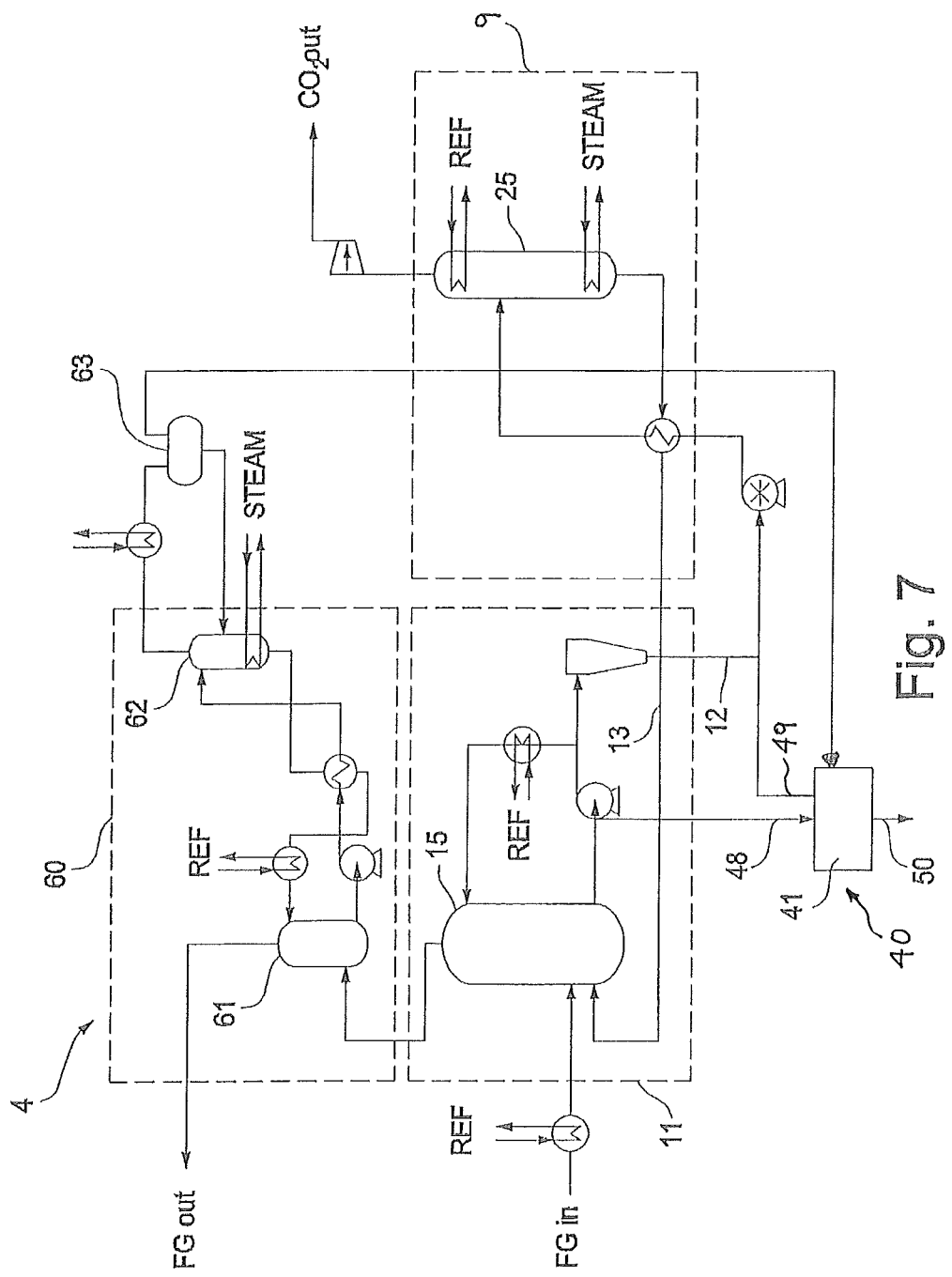
FIG. 7 is a schematic side view depicting an example of a CO2 removal system, in accordance with an embodiment of the present invention.

With reference mainly to FIGS. 5 and 6 a CO2 removal system 4, as best shown in FIG. 7 as described above, is proposed that includes a gas-liquid separating device 40 which comprises a stripper 41 configured to remove water and non-volatiles from the circulating ionic solution by stripping as described in detail above.

FIG. 5 is a schematic illustration of an embodiment wherein the received ammoniated solution is CO2 rich ammoniated solution from the bottom 20 of the CO2 absorber 15 and wherein the gas phase is reintroduced into the regenerator 25.

In the embodiment of FIG. 5, the gas-liquid separating device 40 comprises a stripper 41. The stripper 41 may be configured as, for example, a generally cylindrical shaped steel vessel configured to operate within a pressure range of about 1-5 bar. The stripper 41 is preferably equipped with one or more suitable mass transfer devices (MTD) 42, 42a, 42b as best shown in FIGS. 1-4. The MTD may be, for example, valve trays, sieve trays, structured packing, random packing or other suitable packing materials, or a combination thereof. A heating system/device 43 may be provided in the stripper 41 for heating the ionic solution received by the stripper. The heating system could be heated by low pressure steam (typically with a pressure in the range of 4-8 bar), or, if the amount of heat required is too low to justify the infrastructure for low pressure steam, via electrical heating devices/systems. The stripper 41 is preferably configured to provide sufficient heat to the ammoniated solution so that, at a pressure in the range of 1-5 bar, low boiling point components, for example NH3 and CO2, are transferred to a gas phase, while high boiling point components, for example salts and metals, are collected in a liquid phase at the bottom 46 of the stripper 41. The stripper 41 is configured to discharge the gas phase, containing mainly NH3 and CO2, via a gas exit 44 to fluid connection 49, and the liquid phase, containing mainly water, via a liquid exit 45 to fluid connection 50.

A CO2 capture arrangement 11 is provided wherein a CO2 absorber 15 is preferably equipped with a one or more suitable mass transfer devices (MTD) 18. A flue gas (FG) is supplied via input conduit 17 to a lower portion of the absorber 15 at a point below the MTD. A CO2 lean, ammoniated solution stream via conduit 13 is supplied to the absorber 15 at an upper portion above the MTD 18. The CO2 lean solution is distributed within the absorber by a first fluid distribution system 16a, such as a plurality of sprayers. The CO2 lean solution and the flue gas pass through the MTD in a counter-current direction, whereby the ammonia solution captures the CO2 of the flue gas to provide a CO2 rich solution at the bottom 20 of the absorber 15. Further, the CO2 rich solution is recirculated to the upper portion of the absorber 15 via conduit 21 to a second fluid distribution system 16b, such as a plurality of sprayers, disposed in the absorber. CO2 lean flue gas exits through the upper portion of the absorber through the output conduit 19.

Referring to FIGS. 1 and 5, the stripper 41 is configured to receive CO2 rich ammoniated solution collected at the bottom of the CO2 absorber 15. The rate at which rich ammoniated solution from the CO2 absorber 15 is fed (feed rate) to the stripper 41 is, for example, approximately 0.5% to 2.0% of the feed rate at which CO2 lean ammoniated solution 13 is fed to the CO2 absorber 15. The ammoniated solution received from the CO2 absorber 15 is contacted via a liquid/gas MTD 42, preferably in a countercurrent flow, with upcoming vapors fed to or generated in the bottom of the stripper 41. The difference between equilibrium partial pressure of the ammonia and CO2 in the ammoniated solution flowing downward within the stripper 41 and the vapor pressures of ammonia and CO2 in the upcoming vapor phase results in the ammonia and CO2 transition from the liquid into the vapor phase. As a result, non-volatiles and some water collects at the bottom 46 of the stripper 41 and may be removed easily there from without drawing off ammonia. The gas phase comprising stripped off ammonia and CO2 and a residual amount of steam leaves the stripper 41 via a gas exit 44 at the top of the stripper.

The liquid phase collected at the bottom 20 of the CO2 absorber 15 generally has a temperature in the range of 10-30° C. The liquid phase collected at the bottom 46 of the stripper 41 generally has a temperature in the range of 80-150° C., such as in the range 95-125° C. A heat exchanger 47 may be provided to transfer heat from the liquid phase removed from the bottom of the stripper 41 to the ammoniated solution received from the CO2 absorber 15 (and thereby raise the temperature of the ammoniated solution to a predetermined temperature, for example, in the range of 50-150° C. such as 60-120° C.) before it is introduced into the stripper 41.

The gas phase (CO2, NH3, water vapor) from the stripper 41 may be sent, either in part or completely, towards the regenerator 25 of the regeneration arrangement 12 of FIG. 7. Since the stripper 41 may operate at a pressure in the range 1-5 bar, corresponding to the pressure of the absorber to which it is connected, and the regenerator may operate at a higher pressure, it may be convenient to reintroduce the gas phase into the circulating ammoniated stream e.g. upstream of a feed pump of the regenerator. The liquid phase collected at the bottom 46 of the stripper 41 will preferably be an aqueous solution of non-volatiles low in NH3 and CO2. Depending on the residual ammonia content in the liquid phase, it may be sent to a wash water stripper or directly to battery limits (BL). In this embodiment the invested heat is substantially, if not completely, recovered in the regenerator vessel 25 and/or in the small feed/effluent heat exchanger 47. The heating requirement of the regenerator 25, generally provided for by low pressure (4-8 bar) steam, could thus be reduced.

FIG. 6 is a schematic illustration of an embodiment wherein the received ammoniated solution is CO2 lean ionic solution from the bottom 29 of the regenerator 25 and wherein the formed gas phase is reintroduced into the regenerator 25.

In the embodiment of FIG. 6, the gas-liquid separating device 40 comprises a stripper 41. The stripper 41 may be configured as, for example, a generally cylindrical shaped steel vessel configured to operate within a pressure range of about 10-30 bar. The stripper 41 is preferably equipped with one or more suitable mass transfer devices (MTD) 42. The MTD may be, for example, valve trays, sieve trays, structured packing, random packing or other suitable packing materials, or a combination thereof. A heating system/device 43 may be provided in the stripper 41 for heating the ammoniated solution received by the stripper. The heating system could be heated by medium pressure steam (typically with a pressure in the range of 10-30 bar), or, if the amount of heat required is too low to justify the infrastructure for medium pressure steam, via electrical heating devices/systems. The stripper 41 is preferably configured to provide sufficient heat to the ammoniated solution so that, at a pressure in the range of 10-30 bar, low boiling point components, for example NH3 and CO2, are transferred to a gas phase, while high boiling point components, for example salts and metals, are collected in a liquid phase at the bottom of the stripper. The stripper 41 is configured to discharge the gas phase, containing NH3 and CO2, via a gas exit 44 to fluid connection 49, and the liquid phase, containing non-volatiles, via a liquid exit 45 to fluid connection 50.

The stripper 41 is configured to receive lean ammoniated solution from the regenerator 25. The rate at which CO2 lean ammoniated solution 29 from the regenerator 25 is fed (feed rate) to the stripper 41 is, for example, approximately 0.5% to 2.0% of the feed rate at which rich ammoniated solution is fed to the regenerator 25. The ionic solution received from the regenerator 25 is contacted via a liquid/gas MTD 42 of FIG. 7, preferably in a countercurrent flow, with upcoming vapors (upcoming vapors should be sufficient) fed to or generated in the bottom 46 of the stripper vessel 41. The difference between equilibrium partial pressure of the ammonia and CO2 in the ammoniated solution flowing downward within the stripper vessel 41 and the vapor pressures of ammonia and CO2 in the upcoming vapor phase results in the ammonia and CO2 transition from the liquid into the vapor phase. As a result, water and non-volatiles collect at the bottom of the stripper 41 and may be removed easily there from without drawing off ammonia. The gas phase comprising stripped off ammonia and CO2 and water vapor leaves the stripper via a gas exit 44 at the top of the stripper.

The regenerator 25 of the regeneration arrangement 9 of FIG. 7 is equipped with a mass transfer device (MTD) 28 disposed therein. A CO2 rich ammoniated gas stream 12 is heated by the CO2 lean ammoniated solution 20 via heat exchanger 30. The CO2 rich ammoniated stream exits the regenerator 25 via conduit 13. The CO2 stripped from the heated CO2 rich ammoniated stream exits the regenerator through conduit 26.

The liquid phase collected at the bottom 29 of the regenerator 25 generally has a temperature in the range of 100-150° C. The liquid phase collected at the bottom 46 of the stripper 41 generally has a temperature in the range of 150-250° C. A heat exchanger 47 may be provided to transfer heat from the liquid phase removed from the bottom of the stripper 41 to the ammoniated solution received from the regenerator 25 (and thereby raise the temperature of the ammoniated solution to a predetermined temperature, for example, between 150-200° C.) before it is introduced into the stripper 41.

The gas phase (CO2, NH3, water vapor) from the stripper 41 is sent back, either in part or completely, to the regenerator 25. The liquid phase collected at the bottom 46 of the stripper 41 will preferably be an aqueous solution of non-volatiles low in NH3 and CO2. Depending on the residual ammonia content in the aqueous solution, it may be sent to a wash water stripper or directly to battery limits (BL). In this embodiment the invested heat is substantially, if not completely, recovered in the regenerator vessel 25 and/or in the small feed/effluent heat exchanger 47. The heating requirement of the regenerator, generally provided for by low pressure (4-8 bar) steam, could thus be reduced.

With reference to FIG. 7, the CO2 removal system may, optionally, further comprise an ammonia absorption arrangement operative for removing trace amounts of NH3 present in the gas stream leaving the CO2 absorber 15 of the CO2 capture arrangement 11. An example of an ammonia absorption arrangement is schematically illustrated in FIG. 7 The water wash system 60 generally comprises an ammonia absorber 61 (referred to herein as the NH3 absorber) and a (first) gas-liquid separating device 62 (referred to herein as the NH3 stripper). During the water wash process, a stream of water or an aqueous solution having a concentration of NH3 of less than 5% by weight is circulated between the NH3 absorber 61 and the NH3 stripper 62.

In the NH3 absorber 61, a gas stream depleted in CO2 from the CO2 absorber 15 is brought into contact with the stream of water or an aqueous solution having a concentration of NH3 of less than 5% by weight such that NH3 is absorbed in said stream of water or aqueous solution. At least a portion of the water or aqueous solution used in the NH3 absorber is withdrawn and fed to the NH3 stripper 62. In the NH3 stripper 62, a gaseous phase comprising NH3 is separated from the water or aqueous solution and removed from the ammonia absorption arrangement 60. In addition to NH3, the gaseous phase from the NH3 stripper 62 may also contain water vapor, CO2 and other low-boiling contaminants. The separated gaseous phase comprising NH3 may be returned to the ammoniated solution of the CO2 removal system 4, e.g. to the regenerator 25, to minimize the loss of NH3 from the system. However, in accordance with the embodiment of the invention illustrated in FIG. 7, the gas phase from the NH3 stripper 62 is guided, via a condenser 63 for removing some of the water vapor, to and introduced into the (second) gas-liquid separating device 41 and may there be used to strip volatile compounds from the circulating ammoniated solution, as discussed above in respect of embodiments of the present invention. The water or aqueous solution from which NH3 has been separated may be recycled to the NH3 absorber 61 for use in capturing further NH3 from a gas stream.

In the embodiment described generally in FIG. 7, the ammonia absorption arrangement 60 comprises a condenser 63 configured to receive the gas stream produced by the NH3 stripper 62, and condense water vapor contained therein. The aqueous condensate, preferably with no or low amounts of NH3 and collected in the condenser 63, is returned to the NH3 stripper 62 for further removal of any NH3 left therein and is eventually returned to the ammonia absorber 61 to be used as wash water.

The stripper 41 of the embodiment illustrated in FIG. 7 is arranged to operate at a pressure of 1-2 bar and to receive a CO2 rich ammoniated solution stream from the absorber 15 of the C02 capture arrangement 11. The ammoniated solution is separated by the stripper 41 into an NH3 and CO2 rich gas phase which is reintroduced into the circulating ammoniated solution stream towards the regeneration arrangement 12, and into a liquid phase comprising non-volatile compounds which may thus be removed from the circulating ammoniated solution. Both the gas phase and the liquid phase of the stripper 41 may comprise water. The relative amounts of water in the gas phase and liquid phases, respectively, may depend on how much heating is made in the stripper. The more heating, the more water may be vaporized. Thus, the stripper may also be used to regulate the water balance of the circulating ammoniated solution. According to the embodiment illustrated in FIG. 7, the stripper 41 also receives the overhead fumes, i.e. the gas phase, from the NH3 stripper 62 as mentioned above. The gas phase from the stripper 62, although rich in NH3 in the context of the stripper 62, is relatively lean in NH3 in the context of the stripper 41, typically comprising 3-5 molal, such as about 4 molal, NH3, which may be compared with the NH3 content of the circulating ammoniated solution of typically 5-15 molal, such as 8-14 molal. The gas phase from the stripper 62 may thus assist in stripping the ammoniated solution in the stripper 41 while also adding heat energy to the stripper 41, reducing the external heating requirement of the stripper 41. The NH3 of the gas phase from the stripper 62 will also be stripped in the stripper 41 together with the ammoniated solution, whereby the combined NH3 and other volatiles, such as CO2, of both the ammonia absorption arrangement 60 and the stripper 41 may leave the stripper 41 together towards the regeneration arrangement.

The use of the stripper 41 in the embodiment of FIG. 7 provides at least the advantages of:

Removing non-volatile compounds from the circulating ammoniated solution.

Recovering heat from the stripper 62 in the stripper 41, reducing the heating requirement of the stripper 41 by as much as 50%.

Directing ammonia that would otherwise be lost from the system back to the regeneration arrangement.

Allowing efficient recovery of heat used in the stripping process. As the recovered ammonia is transferred back to the regeneration arrangement in hot vaporized form, the heat consumed during the stripping process of stripper 41 is recovered and used efficiently in carrying out the regeneration of the CO2 capture system, replacing the corresponding portion of heating demand there.

Allowing a more effective control of the system water balance.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode currently contemplated for carrying out this invention, but that the invention will include all embodiments falling within the scope of the appended claims. Moreover, the use of the terms first, second, etc. do not denote any order or importance or chronology, but rather the terms first, second, etc. are used to distinguish one element from another.

The invention claimed is:

1. A method of removing non-volatile compounds from a circulating ammoniated solution stream of a CO2 removal system, the system being arranged to remove carbon dioxide (CO2) from a gas stream by bringing the gas stream into contact with the circulating ammoniated solution stream such that CO2 is removed from the gas stream by the circulating ammoniated solution stream, wherein the CO2 removal system includes:

a CO2 capture arrangement comprising a CO2 absorber configured to receive the gas stream containing CO2 and contacting the gas stream with the ammoniated solution stream such that CO2 is removed from the gas stream by the circulating ammoniated solution stream to form a CO2 rich ammoniated solution stream; and a regeneration arrangement comprising a regenerator configured to receive the CO2 rich ammoniated solution stream from the CO2 capture arrangement, and to separate CO2 from the ammoniated solution to form a CO2 lean ammoniated solution stream, and to return said CO2 lean ammoniated solution stream to the CO2 capture arrangement; said method comprising:

providing a portion of the circulating ammoniated solution stream having non-volatile compounds into a gas-liquid separating device;

separating the portion of the circulating ammoniated solution stream into an ammonia rich gas phase and a liquid phase comprising the non-volatile compounds; and providing the ammonia rich gas phase into the circulating ammoniated solution stream provided to the regenerator.

2. The method of claim 1, wherein the portion of the circulating ammoniated solution stream has a pressure in the range of 1 to 10 bar when it is introduced into the gas-liquid separating device.

3. The method of claim 1, wherein the portion of the circulating ammoniated solution stream has a pressure in the range of 10 to 30 bar when it is introduced into the gas-liquid separating device.

4. The method of claim 1, wherein the portion of the circulating ammoniated solution stream is a portion of the CO2 lean ammoniated solution stream from the regeneration arrangement.

5. The method of claim 1, wherein the non-volatile compounds comprise salts and metals.

6. The method of claim 1, wherein the providing of the portion of the circulating ammoniated solution stream to the gas-liquid separating device comprises:

providing the portion of the circulating ammoniated solution stream to the gas-liquid separating device above a mass transfer device disposed in the gas-liquid separating device.

7. The method of claim 1, further comprising:

transferring heat from the liquid phase to the providing of the portion of the circulating ammoniated solution stream provided to the gas-liquid separating device.

8. The method of claim 1, wherein the portion of the circulating ammoniated solution stream is a portion of the CO2 rich ammoniated solution stream from the CO2 capture arrangement.

9. The method of claim 8, further comprising:

providing a portion of the CO2 lean ammoniated solution stream from the regeneration arrangement to the gas-liquid separating device.

10. The method of claim 8, further comprising;

providing a second gas stream having ammonia from a second gas-liquid separating device to the gas-liquid separating device.

11. The method of claim 10, wherein the providing the second gas stream is provided to the gas-liquid separating device at a point intermediate to a pair of vertically spaced mass transfer devices disposed in the gas-liquid separating device.

12. The method of claim 11, wherein the providing of the portion of the circulating ammoniated solution stream to the gas-liquid separating device comprises:

providing the portion of the circulating ammoniated solution stream to the gas-liquid separating device above the pair of mass transfer devices.

13. The method of claim 1, wherein the gas-liquid separating device comprises a stripper.

14. The method of claim 13, wherein the stripper is heated by steam having a pressure of less than 10 bar.

15. The method of claim 13, wherein the stripper is heated by CO2 lean ammoniated solution from the regenerator.

16. A method of removing non-volatile compounds from a circulating ammoniated solution stream of a CO2 removal system, the system being arranged to remove carbon dioxide (CO2) from a gas stream by bringing the gas stream into contact with the circulating ammoniated solution stream such that CO2 is removed from the gas stream by the circulating ammoniated solution stream, said method comprising:

introducing a portion of the circulating ammoniated solution stream having non-volatile compounds into a gas-liquid separating device, wherein the portion of the circulating ammoniated solution stream is aqueous;

separating the portion of the circulating ammoniated solution stream into an ammonia rich gas phase and a liquid phase comprising the non-volatile compounds, wherein a major portion of the water of the portion of the circulating ammoniated solution stream is separated into the ammonia rich gas phase and a minor portion of the water of the ammoniated solution is separated into the liquid phase comprising the non-volatile compounds; and reintroducing the ammonia rich gas phase into the circulating ammoniated solution stream.

17. A method of removing non-volatile compounds from a circulating ammoniated solution stream of a CO2 removal system, the system being arranged to remove carbon dioxide (CO2) from a gas stream by bringing the gas stream into contact with the circulating ammoniated solution stream such that CO2 is removed from the gas stream by the circulating ammoniated solution stream, said method comprising:

introducing a portion of the circulating ammoniated solution stream having non-volatile compounds into a gas-liquid separating device, wherein the portion of the circulating ammoniated solution stream introduced into the gas-liquid separating device has a flow rate which is less than 25% by volume of the flow rate of the circulating ammoniated solution stream;

separating the portion of the circulating ammoniated solution stream into an ammonia rich gas phase and a liquid phase comprising the non-volatile compounds; and reintroducing the ammonia rich gas phase into the circulating ammoniated solution stream.

* * * * *